United States Patent [19]

Berger

[11] Patent Number: 4,545,016

[45] Date of Patent: Oct. 1, 1985

[54] MEMORY MANAGEMENT SYSTEM

[75] Inventor: Michael F. Berger, Fort Worth, Tex.

[73] Assignee: Tandy Corporation, Fort Worth, Tex.

[21] Appl. No.: 456,448

[22] Filed: Jan. 7, 1983

[51] Int. Cl.⁴ .............................................. G06F 9/46
[52] U.S. Cl. .................................................. 364/200
[58] Field of Search ............................... 364/200, 900

[56] References Cited

U.S. PATENT DOCUMENTS

| 4,300,192 | 11/1981 | Couleur et al. | 364/200 |
| 4,333,144 | 6/1982 | Whiteside et al. | 364/200 |
| 4,633,097 | 12/1982 | Amano et al. | 364/900 |

Primary Examiner—Thomas M. Heckler
Assistant Examiner—Tim A. Wiens
Attorney, Agent, or Firm—Wolf, Greenfield & Sacks

[57] ABSTRACT

A memory management system for providing memory protection for various programs running in a computer such as a 16-bit multi-tasking computer system. The scheme of the present invention provides address translation so as to provide separation of memory spaces. In this connection, each program in the machine has associated therewith, two numbers including an offset number and a limit number. Each program is written so that its base starting address is at the same predetermined address, preferably zero. The address space for each program is separated in memory by adding the offset number for that program to the base address to provide the physical address number. The program is prevented from accessing any memory area outside of its allotted area by comparing the sum of the offset and processor addresses to the limit number. If the result is less than the limit number, the computed address is valid, and if it is outside the limit number then the computed address is considered invalid and an error routine is initiated.

10 Claims, 3 Drawing Figures

MEMORY MANAGEMENT SYSTEM

BACKGROUND OF THE INVENTION

The present invention relates in general to a memory management system. More particularly, there is described herein memory management circuitry for providing memory protection in connection with various programs running in the computer.

Many 16-bit computers presently in use, including the Radio Shack TRS-80, model 16 computer, are multi-tasking systems. In a multi-tasking system, even though only one program or "task" is run at any given time, the actual program codes for many programs are physically resident in the system memory all at the same time. This type of system enables a rapid switching from one program to another program if the presently running program is held up even for a short period of time. By way of example, the running of the program may be held up during a disc access phase of operation.

In a multi-tasking system, it is common to provide some kind of protection for each portion of the system memory in which a program code or data assigned to a particular task resides. Without this protection, system errors are apt to occur. For example, a program might insert its data into the program code of another program or a program might try to execute part of another program's data resulting in system problems.

This protection of program code or data is normally accomplished by performing a translation between the memory addresses produced by the processor (central processing unit) and the actual addresses used to address the memory. The memory spaces allotted for each program and the program's associated data are usually separated by providing a different set of translations of each program. The translations are usually performed by what is typically referred to as a memory management unit. Generally speaking, the memory management unit utilizes either a table stored in memory to perform the translations or a table internally stored in a high speed hardware memory contained in the memory management unit itself. In a typical translation operation, the addresses produced by the processor are provided to the memory management unit which then provides a translated or "physical" address to the actual memory circuitry.

Their presently exists in the art, several different schemes for providing address translation and separation of memory spaces. These different schemes vary considerably in complexity. However, the translation schemes usually involve table look-up sequences. For example, Motorola provides a memory management unit such as their type MC68451L4, 6 or 8. However, this memory management scheme is quite complex, requiring substantial circuitry. Briefly, in the Motorola system, each bus master (or processor) provides a function code and an address during each bus cycle. The function code specifies an address space and the address specifies a location within that address space. The function codes distinguish between user and supervisor spaces and, within these, between data and program spaces. This separation of address spaces provides the basis for memory management and protection by the operating system. However, once again, the circuitry that is employed with the table look-up functions is very complex.

Accordingly, it is an object of the present invention to provide an improved and simplified memory management system for providing memory protection between various programs running in the computer.

Another object of the present invention is to provide improved memory management circuitry for use in a multi-tasking computer system to provide protection for each portion of the system memory in which a program code or data assigns to a particular task resides.

Still a further object of the present invention is to provide an improved memory management system preferably for use with a 16-bit computer having multi-tasking capabilities and in which the memory management circuitry is not only simple but inexpensive and substantially trouble-free in operation.

SUMMARY OF THE INVENTION

To accomplish the foregoing and other objects of this invention, there is provided a multi-tasking computer system including a processor having multiple address and data lines, and a memory for partitionally storing multiple programs with each program having a predetermined base address which in the preferred embodiment is the address zero. In accordance with the invention, there is provided memory management circuitry which comprises means for storing an offset indicia or number with each offset number that is stored, being associated with the corresponding program stored in memory. Means are provided for combining the offset number with the base address to provide an effective address. This effective address is coupled to the memory to access the program that is to be run. The system of this invention preferably further comprises means for storing a limit indicia or limit number, means for comparing the value of the limit number with the effective address, and means responsive to the comparison for providing error condition when the effective address is outside of the limit number. In a preferred embodiment described hereinafter, the offset number is represented structurally by a pair of offset registers which are mutually exclusively enabled. Similarly, there are provided a pair of limit registers which are also mutually exclusively enabled. These offset and limit registers provide the boundary or extent of each of these parameters. Associated with the offset registers are a pair of adders which function as the means for combining the offset number with the base address. One of the adders receives a lower order portion of a processor address while the other adder receives a higher order portion of a processor address. These processor addresses are respectively added by the adders with each adder also receiving respective higher and lower order addresses from the offset registers. The output of the adders is referred to as an effective address. This effective address is coupled to the means for comparing which is a comparator having first and second sets of comparison inputs referred to as P and Q inputs. Means are provided coupling the effective addresses from both adders to the P inputs of the comparator and separate means are provided for coupling the outputs common from both limit registers to the Q inputs of the comparators. When the quantity P excess the quantity Q, then an error condition exists. The effective address is read as being outside of the set limits demarcating the allotted memory space for that particular program. The program is prevented from accessing a memory area outside its allotted area by comparing the sum of the offset and processor addresses to the limit number. If the result is less than the limit, the computed address is valid. However, as indicated, if the respective address at the P inputs is greater than the limit number, then the computed address is considered invalid and an error routine is initiated. Also, in the preferred embodiment of the invention, there are provided a pair of output multiplexers that are associated respectively with the pair of adders mentioned previously. These multiplexers in essence interface the effective address to the memory. The multiplexing enables either the effective address from the adders to be coupled to the memory or also allows direct coupling of processor addresses to the memory.

BRIEF DESCRIPTION OF THE DRAWINGS

Numerous other objects, features and advantages of the invention should now become apparent upon a reading of the following detailed description taken in conjunction with the accompanying drawing, in which.

DETAILED DESCRIPTION

Figure 1:
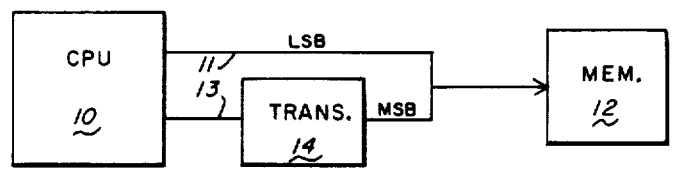
FIG. 1 is a general block diagram showing the pertinent components of a computer system as it relates to the memory management system of this invention.

There is now described in the drawings herein, the details of a memory management system in accordance with the present invention. FIG. 1 shows a very general block diagram involving the system. The details of the memory management circuitry are found in FIGS. 2 and 3. The memory management circuitry of the present invention as exemplified even in the detailed drawing, is relatively simple and yet very effective in providing memory protection between various programs that are run in the computer.

The memory management system described herein forms a part of a total computer system which in the illustrated case is the Radio Shack TRS-80 model 16 computer. Typically, in addition to the memory management circuitry, the computer also includes a central processing unit, interrupt logic, memory interface circuitry, bus arbitration logic, data transfer acknowledge logic, I/O decoding, clock logic, refresh logic and bus error logic. Because the principles of the present invention apply primarily only to the memory management circuitry, the details of the other portion of the computer system are not described herein.

As indicated previously, the computer system that the memory management circuitry forms a part of, is preferably a 16-bit computer having multi-tasking capabilities. FIG. 1 is a simplified block diagram that shows some of the basic components necessary in explaining the concepts of this invention. These components include a central processing unit (CPU) 10, system memory 12, and the translator 14 which contains the memory management circuitry. FIG. 1 also illustrates the lines that interconnect these portions of the computer system. It is noted that these lines include a first address line 11 which contains the least significant bit addresses and a second address line 13 which is coupled to the translator 14 and which represents the most significant bit addresses. Thus, as is evident from the diagram of FIG. 1, the least significant bits are coupled directly to the memory 12 while the most significant bits are coupled to the memory 12 by way of the translator 14.

Figure 2:
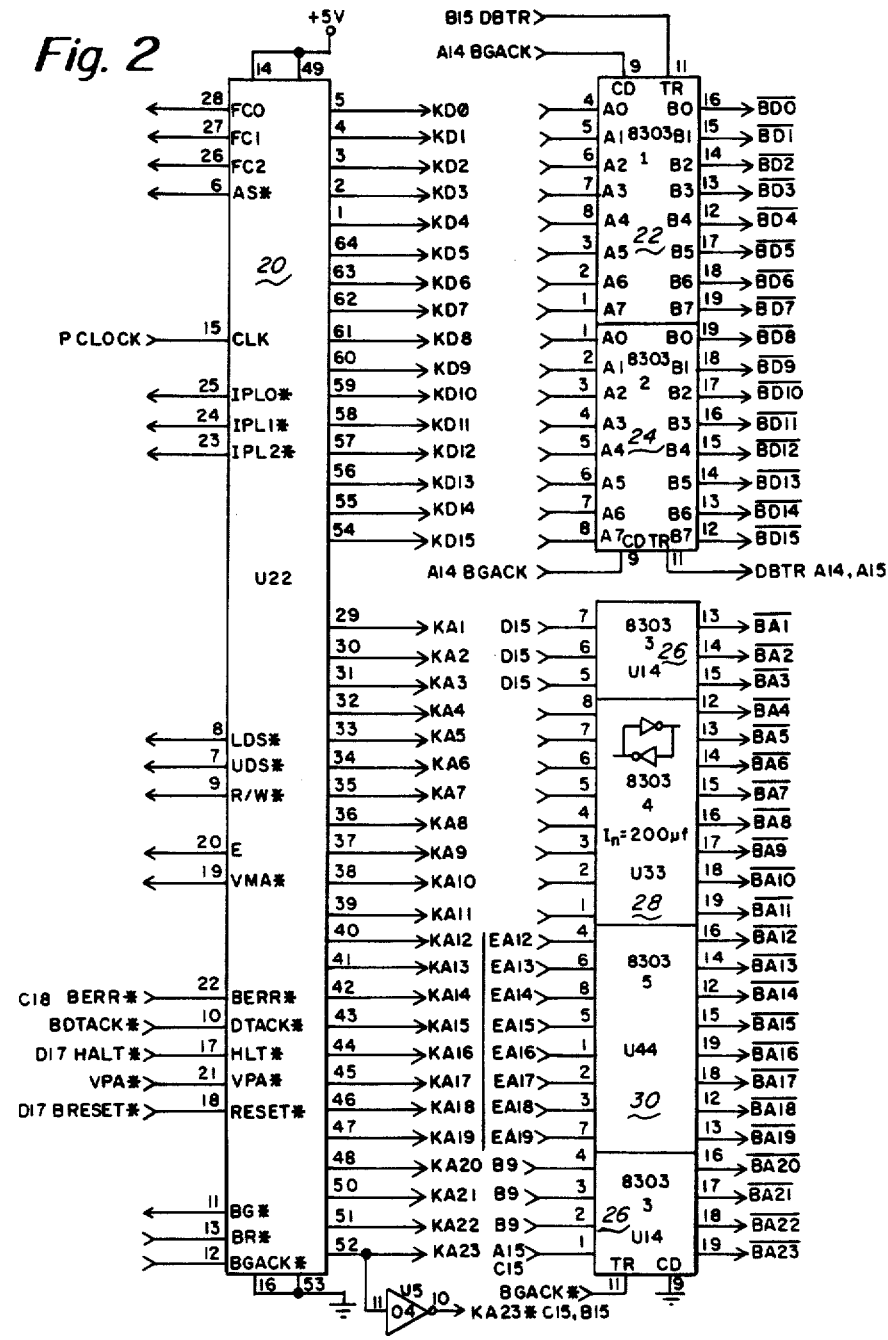
FIG. 2 is a more detailed diagram showing the computer system processor and associated transceivers.
Figure 3:
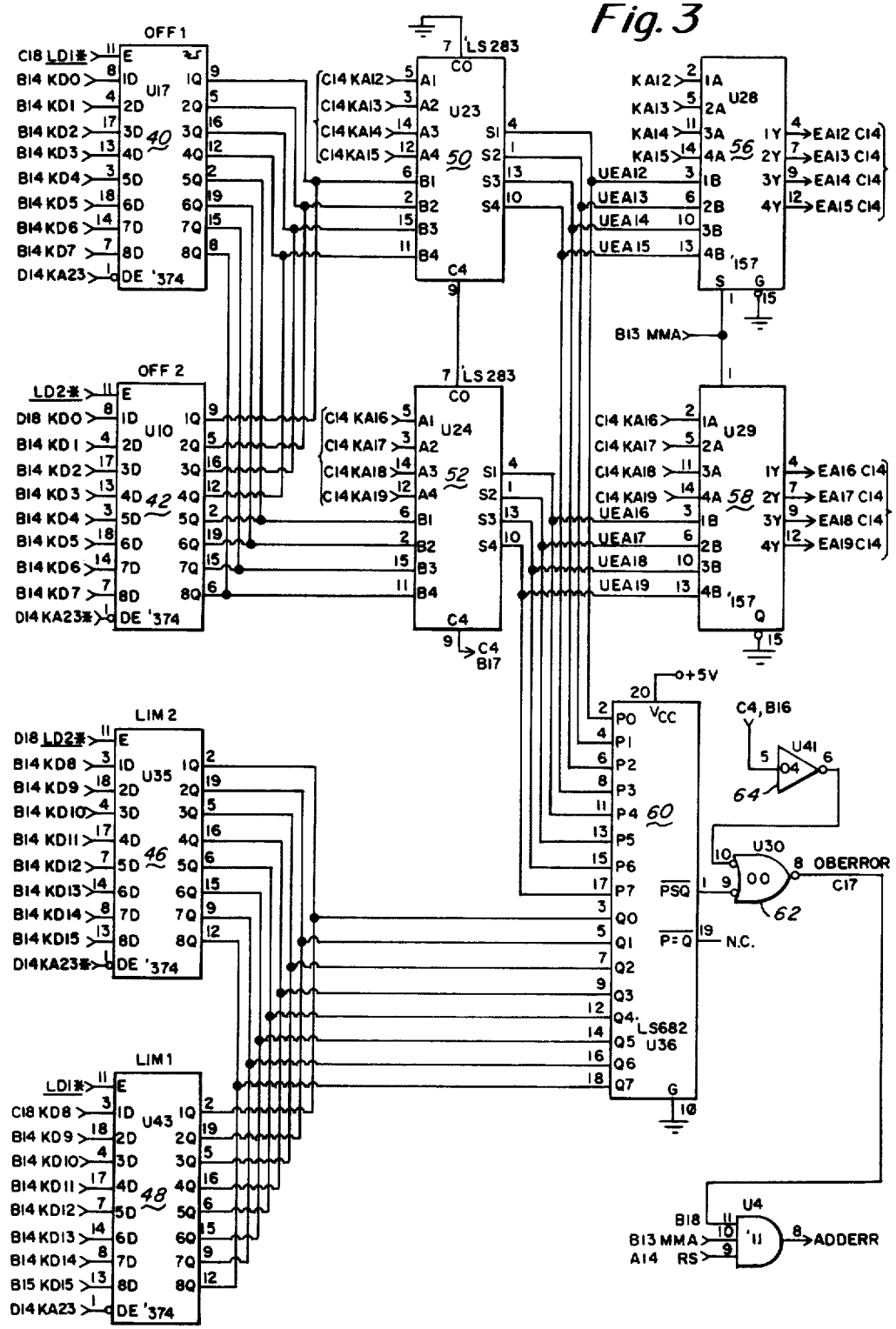
FIG. 3 shows details of the preferred embodiment of the memory management circuitry itself.

With regard to the details illustrated in FIGS. 2 and 3, FIG. 2 shows the processor 20 which is a Motorola type MC68000 having 16 data lines, 23 address lines, and 20 control lines. FIG. 2 also shows a series of transceivers illustrated in a first group as transceivers 22 and 24 and in a second group as transceivers 26, 28 and 30. FIG. 2 shows the transceiver 26 separated into two segments only for the purpose of showing the address lines in proper sequence.

The details of the memory management circuitry are found principally in FIG. 3. In accordance with the concepts of the present invention, each program has associated therewith two numbers; an offset number and a limit number. Each program is written so that its base starting address is at a predetermined initial address, preferably zero. The address space for each program is separated in memory by adding the offset number for that particular program to the base address to provide the physical address number. The program is prevented from accessing a memory area outside of its allotted area by comparing the sum of the offset and processor addresses to the limit number. If the result is less than the limit number, the computed address is valid. On the other hand if it is outside the limit number then the computed address is considered invalid and an error routine is initiated.

As illustrated in FIG. 3, the memory management circuitry includes two sets of offset and limit registers. These registers include a first offset register 40 and a second offset register 42. There is also included a first limit register 46 and a second limit register 48. Each of these registers are of type 374 adapted to handle 8-bits of data. The offset and limit registers define the relocation base address and the absolute limit address, respectively, allowed by the current user program. Providing two sets of limit and offset registers allows all user programs to access a common kernel of the operating system or the run-time package.

In accordance with the memory management scheme, the memory is allocated in 4K-byte increments and relocation is done on a 4K-byte boundaries. Memory management is not active in the system mode or during memory transfers initiated by bus masters other than the 68,000 CPU.

Write protection for the memory outside of the user's partition is provided. Accesses outside of the user's defined partition result in the generation of a bus error exception. An interrupt may also be generated if the interrupt controller (not shown) is properly initialized. There are two occurrences that cause the generation of a bus error. The first is the user addresses being outside their partition. The second is when a bus time-out occurs. A bus time-out exists when non-existent memory or I/O accesses are attempted. The source of the bus error can be determined by reading the status register of the interrupt controller.

In FIG. 3, in addition to the offset registers 40 and 42, and the limit registers 46 and 48 there are also provided a pair of adders 50 and 52, 4-bit multiplexers 56 and 58 and comparator 60. The adders 50 and 52 may be of the type LS283. The multiplexers 56 and 58 may be of type 157. The comparator 60 may be of type LS682.

It is noted in FIG. 3 that the output of the multiplexers 56 and 58 are the effective address lines EA12--EA19. Although not illustrated in FIG. 3, it is understood that these are the effective address lines that couple to the memory for the addressing thereof. Along with these address lines the memory also receives additional address lines directly from the processor as illustrated hereinbefore in FIG. 1.

As indicated previously, FIG. 2 illustrates the basic central processing unit 20 with its associated transceivers or data buffers. All of the details of operation of the CPU 20 are not described herein. However, some of the pertinent signals associated therewith are now discussed in brief. As indicated previously, the processor 20 is a Motorola type MC68000 having 16 data lines KD0-KD15, 23 address lines KA1-KA23, and 20 control lines as identified in FIG. 2. The data lines DK0-KD15 are interfaced to the bus via the transceivers 22 and 24. Each of these transceivers may be of type AMD8303. With respect to these transceivers, when the CD control line at pin 9 is high, this tri-states the data bus. This signal is driven by the signal Bus Grant Acknowledged (BGACK), which indicates that a device other than the 68000 CPU is the bus master.

The TR control line at pin 11 on each of the tranceivers 22 and 24 controls the direction of data transfer. This input is driven by the signal Data Bus Transmit/Receive (DBTR). An active-low output DBTR enables the data transceivers during an off-board interrupt acknowledge sequence or during a read from external memory. The active-high state of the signal DPTR enables the data drivers. It therefore follows, that the data transceivers are disabled when No. 1, a read or write is in progress from the interrupt controller (not shown), No. 2, a board interrupt acknowledge sequence is in progress, and No. 3, a write to external memory occurs. It is also to be noted that the CD control line overrides the TR control line and that both drivers and receivers are disabled (TRI-STATED) if the signal BGACK is asserted.

Still with regard to the processor 20, the address lines KA1-KA23 are interfaced to the address bus via transceivers 26, 28 and 30 which are of the same type as used for the data lines, namely type AMD8303. The CD control line at pin 9 of all of these devices is connected directly to ground as indicated, which always enables address lines KA1-KA11, EA12-EA19, and KA2-0-KA23 to the address bus. The direction control line (TR) at pin 11 of all of the transceivers is switched back by the signal BGACK* which indicates who has bus mastership. If the CPU is bus master, then BGACK* is negated and the address lines are driven onto the bus. If an external device is bus master, then the signal BGACK* is asserted in the address contained on the bus is gated onto the CPU address lines.

With regard to the control lines associated with the processor 20, there are memory access control lines which include Address Strobe (AS*), Lower Data strobe (LDS*), Upper Data Strobe (UDS*), Read/Write (R/W*), and Data Transfer Acknowledge (DTACK*). The signal AS* indicates that there is a valid address on the address lines of the 68000 CPU and it is connected directly to the 68000 subsystem devices.

The Bus AS* (BAS*) depends upon the state of the 68000 CPU. When the processor is in the user state, a delayed AS* is required to allow the extra time needed for address checking of the memory management unit.

The signals LDS*, UDS*, and R/W* are directly interfaced to the bus using a non-inverting transceiver. The signal LDS* indicates that data bits DB0-DB7 are being accessed, and UDS* indicates that the data bits BD8-BD15 are being accessed. If both are asserted at the same time, all 16 data bits are accessed. R/W* indicates whether the data bus transfers a read or write cycle. An active high indicates and a read cycle and an active low indicates a write cycle.

Data Transfer Acknowledge (DTACK*) is the asynchronous handshake signal used by memory and peripheral devices to indicate that a bus cycle has been completed. The signal DTACK* is connected directly to the bus and bcomes BDTACK*.

The bus arbitration lines include the signals Bus Request (BR*), Bus Grant (BG*), and Bus Grant Acknowledge (BGACK*). The signals BR* and BGACK* are inputs to the 68000 CPU and BG* is an output. These signals are used to determine which device will be the next bus master.

The Interrupt Priority Lines (IPL0*-IPL2*) are CPU inputs which indicate the encoded priority of the interrupt-requesting device. The highest priority level is 7; level 0 indicates that interrupts are not requested.

The Function Code Lines (FC0, FC1, and FC2) are outputs from the processor chip which feed a decoder (not shown). This is used to detect accesses to User Space (either code or data) or to decode the Interrupt Acknowledge sequence.

The control lines of the processor 20 also include Peripheral Interface Lines (E, VMA*, and VPA*) which allow the CPU to interface easily to 6800-type devices. The outputs (E and VMA*) are interfaced to the 6800 bus by means of a tranceiver (not shown), in the drawing.

The System Clock input (CLK) to the 68000 CPU is driven by the 6-MHz output of the clock logic (PCLOCK). The signals RESET*, HALT*, and BERR* are connected directly to the 68000 bus. These lines are driven in a wire-or fashion by open collector inverters. The signals RESET* and HALT* are directly controlled by another processor of type Z80.

Thus, in FIG. 2 under proper control, there are provided data bus signals BD0-BD15 coupling from the transceivers 22 and 24. Also, with regard to the transceivers 26, 28 and 30, there are outputs identified as address bus outputs BA1-BA23.

Now,, with respect to the memory management circuitry itself and in particular to the circuits illustrated in FIG. 3, there are two offset registers 40 and 42. The 8-bit input to each of these is from the data lines of the processor 20, illustrated as data inputs KD0-KD7. Thus, for a particular program, there is provided data on these data lines to both of the offset registers 40 and 42, which data is representative of an offset number. The circuitry operates to add the address bits KA1-2-KA19 to the 8-bit value which is stored in the active offset registers. The result of this addition is the effective address EA12-EA19 shown in FIG. 3 at the output of the multiplexers 56 and 58. The effective address is compared to the 8-bit value which is stored in the active limited registers 46 and 48. This comparison takes place by way of the comparator 60. If the effective address is larger than the contents of the active limit register, or if the addition results in a carry overflow from the adder, a bus error is generated, identified in FIG. 3 as the error signal OBERROR coupled from the output of the gate 62.

It is noted that the processor address KA23 determines which set of offset and limit registers are used. If the signal KA23 is high, then the registers 40 and 48 are active. On the other hand if the address signal KA23 is low, then the offset and limit registers 42 and 46 are active.

Two offset registers and two limit registers are used so as to demarcate the two extents of the number range. Each of the two extents is implemented with an offset register and a limit register, which are both of type 74LS374. These are 8-bit D-type registers. The 8-bit value in the offset register is added to the 8-processor address lines KA12-KA19 to form user extend address lines UEA12-UEA19. This addition is accomplished by means of the adders 50 and 52. The adder 50 receives the output from one of the offset registers at its input terminals B1-B4. The adder 50 also receives inputs at its other adder terminals A1-A4 from the respective processor address lines KA12-KA15. Similarly, the adder 52 receives four inputs at terminals B1-B4 from one of the offset registers and also receives inputs at terminals A1-A4 from the processor address lines KA16-KA19. The adder 50 in essence receives the lower order field of the offset number while the adder 52 receives the higher order field of the address number. The lower order field corresponds to data lines KD0-KD3 while the higher order field corresponds to data lines KD4-KD7.

The user extend address lines UEA12-UEA19 coupling from the adders 50 and 52 connect by means of two separate paths, one to the multiplexers 56 and 58 and the other to the comparator 60. The comparator 60 is used to compare the effective address with the value in the limit register. The effective address is coupled to the input terminals P0-P7 of comparator 60 while the contents of the limit register that is active couples to the input terminals Q0-Q7. If the effective address is greater than the limit number, an out-of-bounds error is generated. This is shown at the output pin 1 of the comparator 60 coupled by way of the gate 62 to provide the error OBERROR. A carry-out of the adders 50 and 52 (signal C4) also generates an error. This signal is coupled by way of an inverter 64 to a second input of the OR-type gate 62 to provide the error OBERROR. Furthermore, if the signal OBERROR occurs when the signal MMA and MAS are also active, then an address Error is generated (ADERR). This signal is one of the interrupt sources.

As mentioned previously, there are two paths of signal transfer from the outputs of the adders 50 and 52. The first path just discussed, is the one to the comparator 60. There is also a second path to the two 4-bit multiplexers 56 and 58, each of type LS157. These multiplexers select either the processor address (KA12-KA19) or the User Extent Address (UEA12-UEA19) to form the Effective Address (EA12-EA19). In this connection, as illustrated in FIG. 3, the signal MMA (Memory Management Address) selects the address source, and the upper processor address KA23 selects the active extent. For a one megabyte memory space, 8-bits of memory management allow 4K minimum granule sizes to be protected. It is also noted that the address KA22 when asserted selects the I/O device address space. The I/O device strobe generation logic generates the I/O strobes necessary to communicate with interrupt controller and memory management registers by decoding the address KA21 and KA22.

Thus, to summarize, the memory management in accordance with the invention operates on the basis of each individual program that is stored having associated therewith, two numbers; one an offset number and the other a limit number, or more appropriately a range of these numbers. Each program is written so that its base starting address is zero. The address space for each program is separated in memory by adding the offset number for that prograim to the base address to provide the physical address number. In the illustration of FIG. 3, this addition takes place by means of the adders 50 and 52 which provide the effective addresses at the outputs thereof referred to hereinbefore as addresses UEA12-UEA19. The program is prevented from accessing a memory area outside of its allotted area by comparing the sum of the offset and processor addresses to the limit number. If the result is less than the limit number, the computed address is valid and if it is outside the limit, then the computed address is invalid and an error routine is initiated. This comparision takes place by means of the comparator 60 which it will note compares the effective address from the adders, with the number in the limit register.

Having described one embodiment of the present invention, it should now be apparent to those skilled in the art that numerous other embodiments are contemplated as falling within the scope of this invention.

What is claimed is:

1. In a multi-tasking computer system including a processor having multiple address and data lines, and a memory for partitionally storing multiple programs with each program having a predetermined base address, memory management circuitry comprising: means for storing an off-set indicia with each off-set indicia so stored being associated with a corresponding program stored in memory, said means for storing an off-set indicia comprising first and second off-set register means each defining an end bound of the off-set number range and means for mutually exclusively enabling the first and second off-set register means, means for combining said off-set indicia with said base address to provide an effective address, said means for combining comprising first and second adder means with each adder means having one input means for receiving said base address, another input means coupled from the off-set register means and an output means at which is provided the effective address, means coupling the effective address to the memory to access the running program, means for storing a limit indicia with each limit indicia so stored being associated with a corresponding program stored in memory, said means for storing a limit indicia comprising first and second limit register means each defining an end bound of the limit number range and means for mutually exclusively enabling the first and second limit register means, and comparator means having one input means for receiving the limit register means address, another input means for receiving the effective address and an output means for providing an error signal when the effective address falls outside of the limit register means address.

2. In a multi-tasking computer system as set forth in claim 1 wherein each program has the same base address.

3. In a multi-tasking computer system as set forth in claim 2 wherein the base address is zero.

4. In a multi-tasking computer system as set forth in claim 1 including means coupling lower order addresses from the off-set register means to said another input means of the second adder means and means coupling lower order processor addresses to said one input means of the first adder means.

5. In a multi-tasking computer system as set forth in claim 4 including means coupling lower order addresses from the second off-set register means to the said another input means of the first adder means.

6. In a multi-tasking computer system as set forth in claim 5 including means coupling higher order addresses from the second off-set register means to the said another input means of the second adder means and means coupling higher order processor addresses to said one input means of the second adder means.

7. In a multi-tasking computer system as set forth in claim 6 including means coupling higher order addresses from the first off-set register means to the said another input means of the second adder means.

8. In a multi-tasking computer system as set forth in claim 7 including means coupling the effective addresses from both adder means to the said another input means of the comparator means, and means coupling the outputs in common from both limit register means to the said one input means of the comparator means.

9. In a multi-tasking computer system as set forth in claim 1 including first and second multiplexer means each having one input means for receiving said base address, another input means coupled from the adder means and an output means at which is provided the effective address.

10. In a multi-tasking computer system as set forth in claim 9 including means for commonly controlling the multiplexer means to couple to the output means thereof either the effective address or processor address.

* * * * *